(12) United States Patent
Millar

(10) Patent No.: US 7,329,337 B2
(45) Date of Patent: Feb. 12, 2008

(54) UNIVERSAL FILTER BASE AND ENGINES USING SAME

(75) Inventor: James Sutherland Millar, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 252 days.

(21) Appl. No.: 10/443,278

(22) Filed: May 22, 2003

(65) Prior Publication Data

US 2004/0232090 A1 Nov. 25, 2004

(51) Int. Cl.
*B01D 35/30* (2006.01)

(52) U.S. Cl. .......................... 210/85; 210/90; 210/232; 210/249; 210/443; 210/450; 210/DIG. 17

(58) Field of Classification Search ................ 210/249, 210/443, 444, 450, DIG. 17, 232, 440, 85, 210/90; 285/95, 120.1, 136.1; 123/195 A, 123/196 A
See application file for complete search history.

(56) References Cited

U.S. PATENT DOCUMENTS

| | | | |
|---|---|---|---|
| 3,061,101 A * | 10/1962 | Humbert, Jr. ............... 210/130 |
| 3,259,247 A | 7/1966 | Tietz |
| 3,395,808 A | 8/1968 | Offer |
| 3,618,776 A | 11/1971 | Kudlaty |
| 4,251,374 A | 2/1981 | Cunningham |
| 4,335,688 A | 6/1982 | Diederich, Jr. |
| 4,634,527 A | 1/1987 | Marshall |
| 5,013,434 A * | 5/1991 | Furrow ....................... 210/232 |
| 5,178,753 A | 1/1993 | Trabold |
| 5,291,969 A | 3/1994 | Diederich, Jr. |
| 5,474,098 A | 12/1995 | Grigorian et al. |
| 5,853,575 A * | 12/1998 | Wydra et al. ................ 210/136 |
| 6,426,001 B1 | 7/2002 | Fritz |
| 6,833,066 B2 * | 12/2004 | Baumann et al. ........... 210/136 |
| 2002/0125188 A1 | 9/2002 | Hacker et al. |

FOREIGN PATENT DOCUMENTS

WO   WO 0169050 A2 *   9/2001

* cited by examiner

*Primary Examiner*—Matthew O. Savage
(74) *Attorney, Agent, or Firm*—Liell & McNeil

(57) ABSTRACT

Filters that remove particulate and other solids from fluids often come in various sizes and include various types of seals. However, filter bases to which the filters are attached are generally manufactured to accommodate only one specific size of filter including one type of seal. A filter base of the present invention includes a filter attachment portion and a sealing portion. In order to expand the different sizes of filters that the filter base can accommodate, the sealing portion includes a first annular sealing surface with a relatively small diameter and a second annular sealing surface with a relatively large diameter. The two sealing surfaces can be any combination of radial and a face sealing surfaces. The filter base is used for filtering fluids, such as fuel, in an internal combustion engine.

4 Claims, 4 Drawing Sheets

UNIVERSAL FILTER BASE AND ENGINES USING SAME

TECHNICAL FIELD

The present invention relates generally to filter bases for internal combustion engines, and more specifically to a filter base that can accommodate filters with different sized diameters.

BACKGROUND

It is well known in the art to use filters of various types and sizes in order to remove particulate from fluids. For instance, most diesel fuel systems include at least one fuel filter that separates particulates and other solids from fuel prior to the fuel being injected into the engine. Typically, fuel filters include a canister in which a filter element is positioned. The filter element is comprised of a medium that traps the particulates and solids as the fuel flows though the medium. Generally, the filter is attached to a filter base that is attached to either an engine or a chassis of the vehicle or work machine. The filter may be coupled to the filter base via a threaded portion of the filter base, and a contact area between the filter base and the filter may be sealed in order to prevent leakage.

Filter bases are generally designed to accommodate a particular size of fuel filter including a specific type of seal. For instance, a filter often includes an annular seal that is positioned adjacent to the diameter of the filter. These seals can be radial seals that have a rounded cross section or face seals that have a rectangular cross section. Due to the different shapes of the seals, each type of seal requires a different receiving surface on the filter base. Whereas the radial seals can be received within an annular rounded groove, the face seals can contact an annular planar surface. Thus, each filter base is designed to have a sealing surface that has a diameter corresponding to the sealing diameter of a specific fuel filter and a seal receiving portion that corresponds to the specific type of seal of the filter. Therefore, when a specific filter base is attached to the engine or chassis, there is generally only one diameter fuel filter that can be attached to the base; however, it is known to use more than one filter with a particular fuel system.

The fact that a specific filter base must be manufactured for each diameter of a filter increases the costs of manufacturing filter bases. If there was one filter base that could accommodate multiple sizes of filters, the number of production lines could be decreased. Moreover, there would be less parts for design and inventory purposes, reducing the risk that a customer will receive the incorrect part. In addition, the fact that a different fuel filter base must be used with each different sized fuel filter may cause inconvenience for the customer. If more than one sized fuel filter could attach to the filter base, the customer would have more choice as to the fuel filter they want to use. For example, a fuel filter including a larger diameter may include a larger filtration area of the filter element. Thus, the time between required filter changes could be extended, and proper fuel filtration could be achieved even when the fuel quality was not as high as expected.

Although a filter base that can sometimes accommodate filters of different lengths and a filter base that can accommodate filters of different types are known in the art, a filter base that can accommodate filters including different diameters and/or seals is not known in the art. For instance, the interchangeable filter apparatus, shown in U.S. Pat. No. 4,251,374, issued to Cunningham, on Feb. 17, 1981, is capable of coupling several different filter elements, including a bag filter, a disc and sleeve filter, a cartridge filter, and a strainer for when the apparatus is to be used as an ion exchange column, to a base. However, the Cunningham filter apparatus does not include a base that can accommodate filters of the same type but, with various diameters and sealing means.

The present invention is directed at overcoming one or more of the problems set forth above.

SUMMARY OF THE INVENTION

In one aspect of the present invention, a filter base includes a filter attachment portion and a sealing portion. The sealing portion includes a first annular sealing surface with a relatively small diameter and a second annular sealing surface with a relatively large diameter.

In another aspect of the present invention, a filter base includes a filter attachment portion and a sealing portion. The sealing portion includes a first annular sealing surface that includes one of a radial seal receiving portion and a face seal receiving portion, and a second annular sealing surface that also includes one of a radial seal receiving portion and a face seal receiving portion.

In yet another aspect of the present invention, a group of engines includes a substantially identical filter base. A portion of the plurality of engines include a filter with a relatively small diameter attached to the filter base. Another portion of the plurality of engines include a filter with a relatively large diameter attached to the filter base.

DETAILED DESCRIPTION

Figure 1:
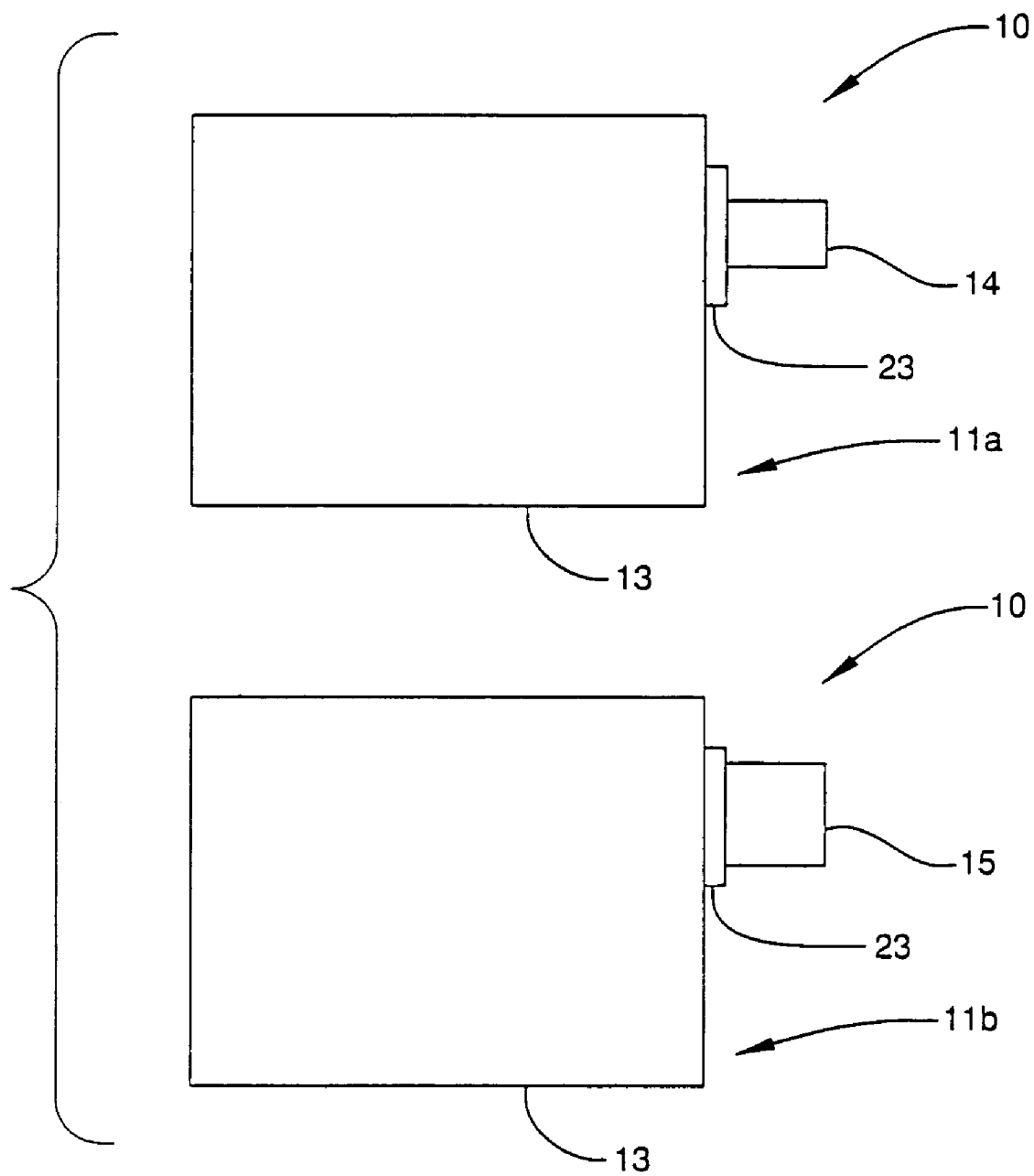
FIG. 1 is a schematic representation of a group of engines, according to the present invention.

Referring to FIG. 1, there is shown a schematic representation of a group of engines 10, according to the present invention. The group of engines 10 includes a first portion 11a and a second portion 11b. Each engine within the group of engines 10 includes an engine housing 13 to which a fuel filter base 23 is attached. The filter bases 23 attached to each engine are substantially identical to one another. Further, the engines within the group of engines 10 are preferably substantially identical to one another. However, each engine within the first portion 11a includes a first filter 14 with a relatively small diameter attached to the filter base 23 and each engine within the second portion 11b includes a second filter 15 with a relatively large diameter attached to the filter base 23. Although the present invention contemplates a plurality of the engines within the group 10 including filters with diameters different than the diameters of filters 14 and 15, preferably each engine within the group 10 includes at least one of the first filter 14 with the relatively small diameter and the second filter 15 with the relatively large diameter.

Although not necessary, the filters 14 and 15 attached to the filter base 23 are fuel filters. The present invention also contemplates filters for fluids other than fuel, including but not limited to, oil filters, coolant filters, transmission fluid filters, and the like. The fuel filters 14 and 15 are illustrated as conventional fuel filters that include a canister housing a filter element that can trap particulates and other solids from fuel flowing through the filter element. However, it should be appreciated that the filter base 23 of the present invention can be applicable to any type of fluid filter, including oil filters. Further, the filter base 23 need not be attached to the engine housing, such as being attached to a chassis of a motor vehicle or work machine. Although the filters 14 and 15 could include various types of seals that seal the attachment between the filter base 23 and the filter 14 and 15 in order to prevent leakage, preferably, each filter 14 and 15 includes one of a radial seal 18 and a face seal 19 (shown in FIGS. 2 and 3).

Figure 2:
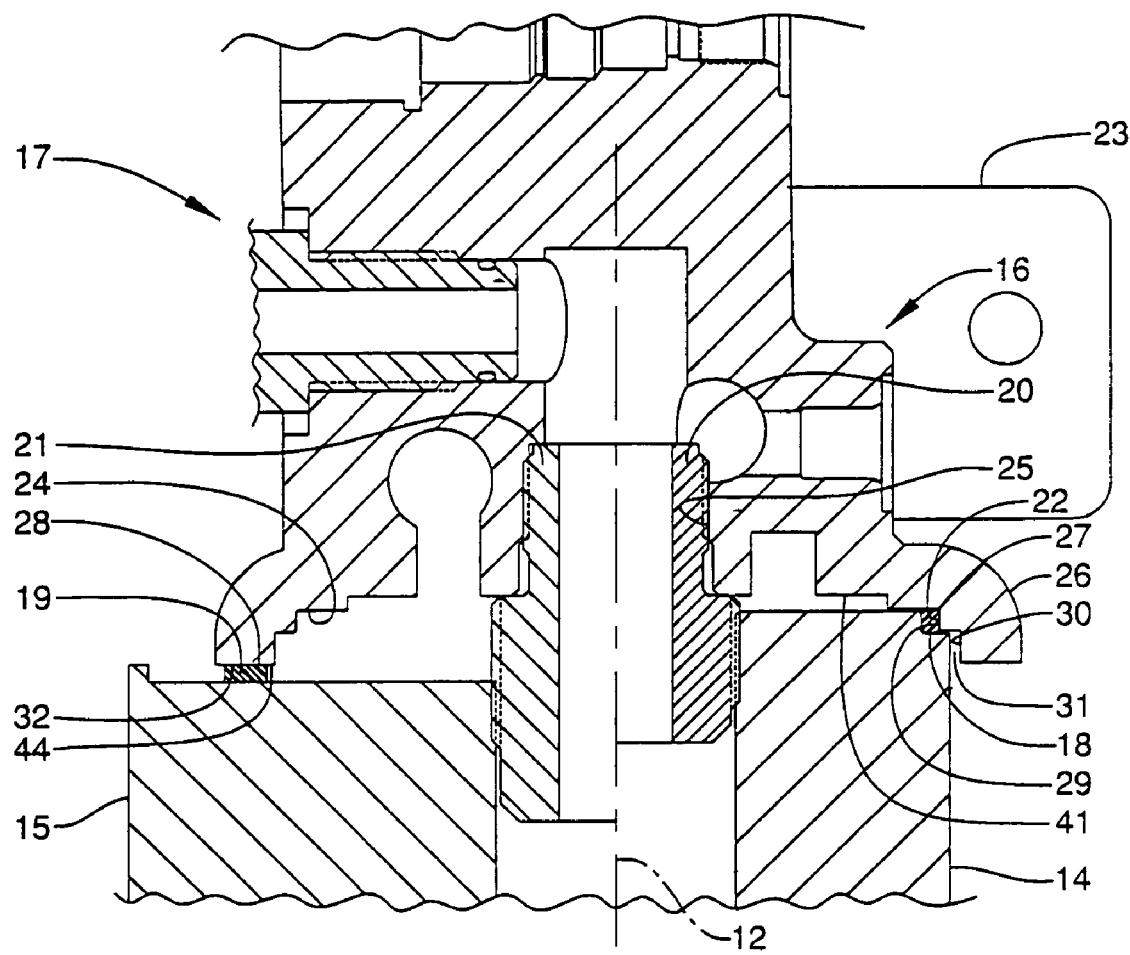
FIG. 2 is a sectioned diagrammatic view illustrating a first filter attached to a filter base on a left side with a face seal, and a second filter attached to the filter base on a right side with a radial seal, according to an embodiment of the present invention.

Referring to FIG. 2, there is shown a sectioned side diagrammatic view illustrating the first filter 14 attached to the filter base 23 on a right side 16 and the second filter 15 attached to the filter base 23 on a left side 17, according to one embodiment of the present invention. For purposes of this discussion, a centerline 12 splits the filter base 23 such that the first filter 14 (only half is shown) is attached to the filter base 23 on the right side 16 of the centerline 12, and the second filter 15 (only half is shown) is attached to the filter base 23 on the left side 17 of the centerline 12. However, it should be appreciated that only one of the filters 14 and 15 can be attached to the illustrated filter base 23 at one time. A filter attachment portion 25 and a sealing portion 26 are included on a bottom side 41 of the filter base 23. Although not illustrated, it should be appreciated that one filter base 23 could include more than one filter attachment portion, allowing multiple filters to be attached to the filter base 23. The description of the present invention would be similar for each filter attachment portion of a multiple filter base. Each attachment portion of the multiple filter base could accommodate at least two different sized fuel filters. Thus, the multiple filter base could accommodate two filters with different sized diameters.

Preferably, according to the embodiment illustrated in FIG. 2, the first filter 14 with the relatively small diameter includes the radial seal 18. The annular radial seal 18 is positioned adjacent the relatively small diameter of first filter 14, and includes a D-shaped cross section. The second filter 15 with the relatively large diameter includes the annular face seal 19 that is positioned adjacent the relatively large diameter of the second filter 15, and includes a rectangular cross section. The present invention contemplates that the radial seal 18 and the face seal 19 can be comprised of various materials and be of various shapes known in the art.

The filter attachment portion 25 of the filter base 23 includes a first adapter 20 when the first filter 14 is attached to the filter base 23, and includes a second adapter 21 when the second filter 15 is attached to the filter base 23. The first and second adapters 20 and 21 can be attached to the filter base 23 in a conventional manner, such as via a threaded engagement. Both the first adapter 20 and the second adapter 21 include a threaded stud to which internal threads of the first filter 14 and the second filter 15 can be mated, respectively. The first and second adapters 20 and 21 are sized for attachment to the particular filters 14 and 15. Although the filter base 23 of the present invention is illustrated as including the adapter 20 and 21 for each filter 14 and 15, it should be appreciated that the present invention contemplates the filter base 23 accommodating both filters 14 and 15 with the use of the same adapter or without the use of an adapter. This alternative could be accomplished by modifying available filters to have identical mating geometry. In addition, the adapter need not necessarily be a separate component; it could be integral with the base 23.

The sealing portion 26 includes at least a first annular sealing surface 22 and a second annular sealing surface 32, although it should be appreciated that the present invention contemplates more than two annular sealing surfaces. The more sealing surfaces, the more fuel filters including different seals and/or different diameters can be attached to the filter base 23. In the illustrated embodiment, the first sealing surface 22 has a cylindrical shape concentric with centerline 12 and a relatively small diameter that corresponds with a diameter of the radial seal 18 that is positioned adjacent to the relatively small diameter of the first filter 14. Further, according to the illustrated embodiment, the first sealing surface 22 includes a radial seal receiving portion 27. The sealing portion 26 of the filter base 23 includes an annular stepped surface 24 that is illustrated as including three steps. The annular stepped surface 24 defines a stepped cavity 31 in which the attached first filter 14 is partly positioned. The radial seal receiving portion 27 is included within a middle step 29 of the annular stepped surface 24. The middle step 29 defines a rounded groove in which the radial seal 18 can be received during attachment of the first filter 14 to the filter base 23. Thus, the rounded groove defined by the middle step 29 acts as the radial receiving portion 27 in the illustrated embodiment. An outer step 30 of the stepped surface 24 can act as a spray shield in the event of leakage. If a leak should occur around the radial seal 18, the resulting fluid spray can be deflected by an over hanging portion of the outer step 29 of the filter base 23 so that hot fluid does not spray directly onto the engine, but instead tends to run deflected down an outer surface of the first filter 14.

The second sealing surface 32 includes a relatively large diameter corresponding to a diameter of the face seal 19 that is positioned adjacent to the relatively large diameter of the second filter 15. According to the illustrated embodiment, the second sealing surface 32 includes a face seal receiving portion 28. Unlike the radial seal receiving portion 27, the face seal receiving portion 28 is illustrated as being a relatively planar surface 44. In the illustrated embodiment, a bottom surface 44 of the outer step 30 of the stepped surface 24 acts as the face seal receiving portion 28. Thus, the second filter 15 does not extend into the stepped cavity 31 as does the first filter 14. Although the outer step 30 does not provide an overhang that can act as the spray shield when the second filter 15 is attached to the filter base 23, a separate spray shield or shroud can be attached to the filter base 23 in a conventional manner in order to protect the engine from leaked hot fluid. It should be appreciated that a portion of the canister of the filter 15 can extend radially beyond a contact area between the face seal 19 and the second annular sealing surface 32.

Figure 3:
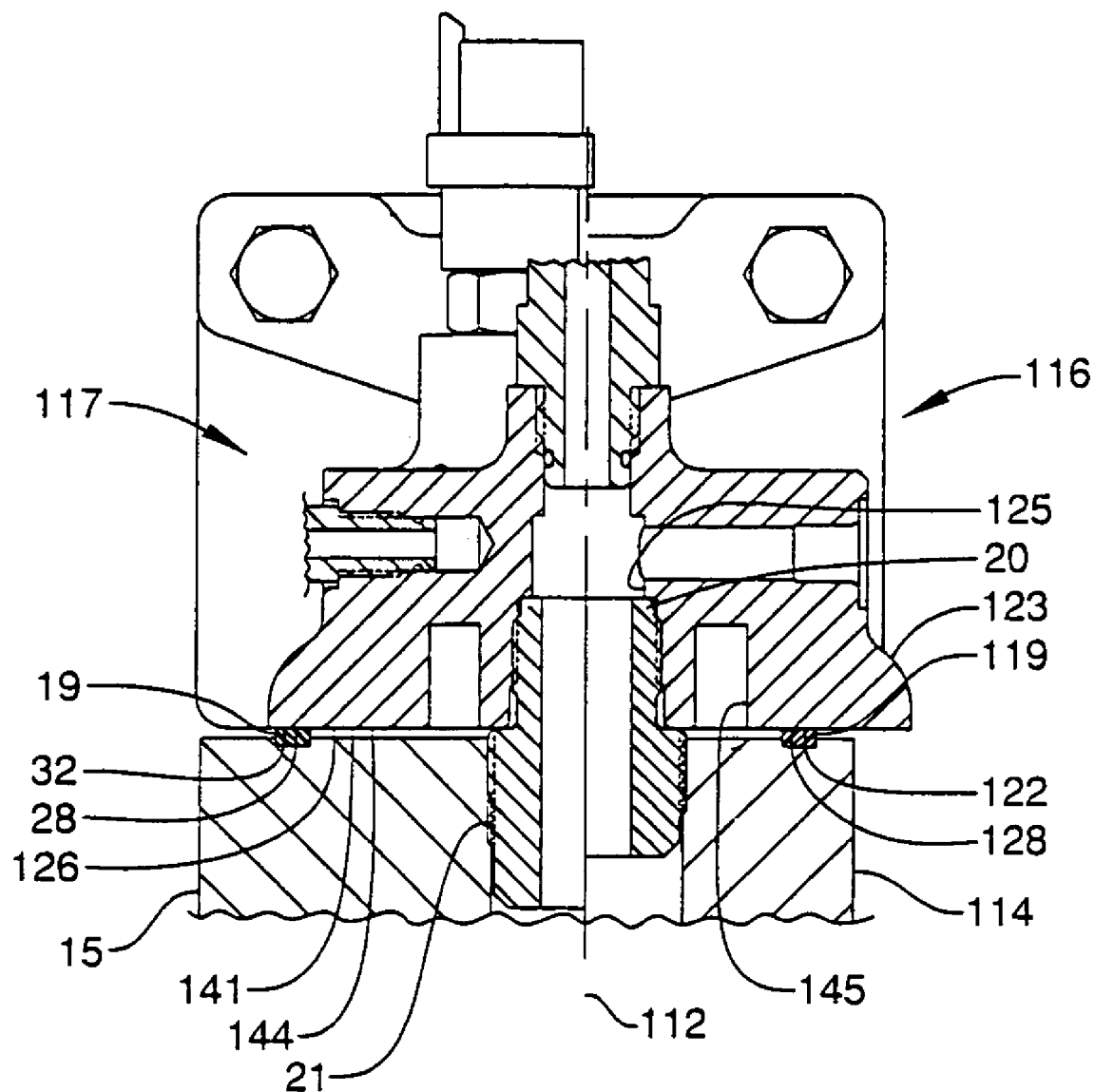
FIG. 3 is a sectioned isometric diagrammatic view illustrating a first filter attached to a filter base on a left side, and the second filter attached to the filter base on a right side, both with face seals, according to an alternative embodiment of the present invention.

Referring to FIG. 3, there is shown a sectioned view illustrating a first filter 114 attached to the filter base 123 and the second filter 15 attached to a filter base 123, according to an alternative embodiment of the present invention. For purposes of this discussion, a centerline 112 splits the filter base 123 such that, the first filter 114 is attached to the filter base 23 on a right side 116 of the centerline 112, and the second filter 15 is attached to the filter base 123 on a left side 117 of the centerline 112. However, it should be appreciated that only one of the filters 114 and 15 can be attached to the illustrated filter base 123 at one time. The filter attachment portion 125 and sealing portion 126 are included on a bottom side 141 of the filter base 123. Although not illustrated, it should be appreciated that one filter base 123 could include more than one filter attachment portion, allowing multiple filters to be attached to the filter base 123. The description of the present invention would be similar for each filter attachment portion of a multiple filter base. Each attachment portion of the multiple filter base could accommodate at least two different sized fuel filters. Thus, the multiple filter base could accommodate two filters with different sized diameters.

According to both embodiments of the present invention, the second filter 15 includes the relatively large diameter and the face seal 19. Further, according to both embodiments, the first filter 114 includes the relatively small diameter. However, the first filter 114 includes a face seal 119; whereas, in the embodiment illustrated in FIG. 2, the first filter 14 includes the radial seal 18. The sealing portion 126 includes a first annular sealing surface 122 and the second annular sealing surface 32. Similar to the other embodiment, the filter attachment portion 125 includes the first adapter 20 when the first filter 114 is attached to the filter base 123, and the second adapter 21 when the second filter 15 is attached to the filter base 123. According to the alternative embodiment, the sealing portion 126 of the filter base 123 need not include the stepped surface 24 of the FIG. 2 embodiment. Rather, the sealing portion 126 includes a bottom planar surface 144 that has a width sufficient to include both the first and the second annular sealing surfaces 122 and 32. The sealing portion 126 is radially separated from the filter attachment portion 125 via an annular separation cavity 145. The first annular sealing surface 122 has a diameter that corresponds with a diameter of the face seal 119 that is positioned adjacent to the relatively small diameter of the first filter 114. The second annular sealing surface 32 includes a diameter that corresponds to the diameter of the face seal 19 positioned adjacent to the relatively larger diameter of the second filter 15. The first and second annular sealing surfaces 122 and 32 include a first and second face seal receiving portion 128 and 28, respectively. Both face seal receiving portions 128 and 28 are portions of the bottom, planar surface 144 of the filter base 123. A shroud can be attached to the base 123 to protect against spray leakage.

Although the present invention has been described for the filter base 23 that can accommodate the filter 14 with the radial seal 18 and the filter 15 with the face seal 19, and the filter base 123 that can accommodate the filter 114 and the filter 15 both with face seals 19 and 119 of different diameters, it should be appreciated that the present invention contemplates a filter base that can accommodate a relatively small diameter filter and a relatively large diameter filter both including radial seals. For instance, the filter base can be designed to include a larger stepped surface. An inner step can serve as a first radial seal receiving portion and an outer step at a greater radial distance from a centerline of the filter base can serve as a second radial seal receiving portion. Moreover, the present invention contemplates a filter base that can accommodate a relatively small diameter filter including a face seal, and a relatively large diameter filter including a radial seal. The filter base can be designed such that a planar surface radially separates a stepped surface including a radial seal receiving portion from a centerline of the filter base. The planar surface can include a face seal receiving portion.

Figure 4:
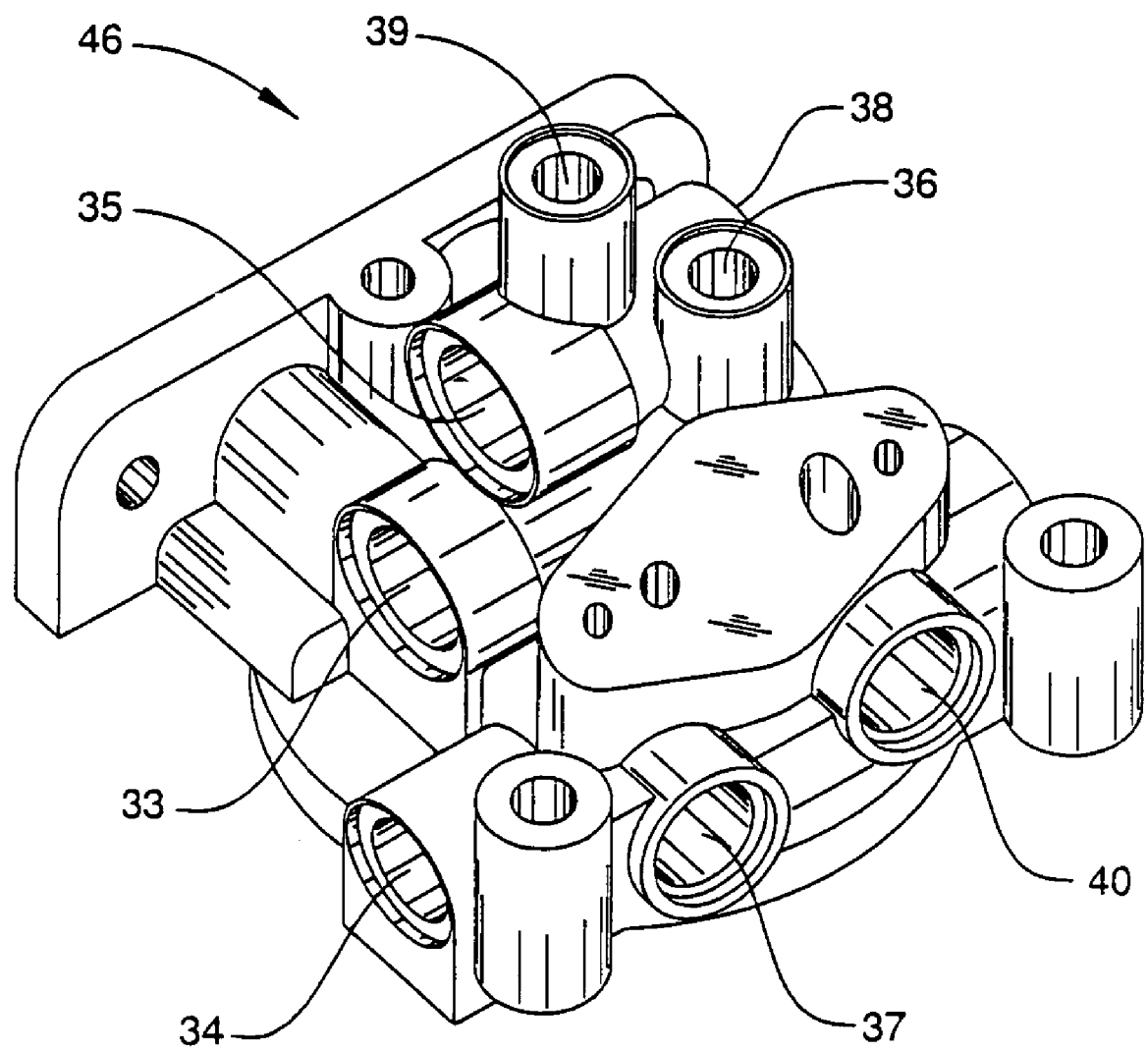
FIG. 4 is a isometric view of an identical passage portion of the filter bases of FIGS. 2 and 3.

Referring to FIG. 4, there is shown an isometric view of an identical passage portion 46 of the filter bases 23 and 123 of FIGS. 2 and 3. Although not necessary, in the illustrated example, the passage portion 46 acts as a common housing for various components and passageways. For instance, a pressure differential sensor, an absolute pressure sensor and a temperature sensor can be mounted in a differential pressure sensor port 33, a pressure sensor port (on side not shown), and a temperature sensor port 34 defined by the passage portion 46, respectively. Further, a priming pump (not shown) can be, at least partially, positioned within the common housing of the passage portion 46. It should be appreciated that the priming pump could be of various types, including but not limited to, a hand priming pump or an electrically operated priming pump. The passage portion 46 can also house a pressure regulating valve 35 that is positioned within a return passage of the passage portion 46.

In addition to various components attached to the passage portion 46, it also can include various internal passageways that are fluidly connected to other passageways within a fuel system via five ports. The passage portion 46 includes a priming inlet port 36 fluidly connectable to a source of fuel via a priming supply line, a filter inlet port 37 fluidly connectable to a supply pump via a portion of a supply line, an injector return port 38 fluidly connectable to at least one fuel injector via a portion of a return line, a tank return port 39 fluidly connectable to a fuel source via another portion of the return line, and a filter outlet port 40 fluidly connectable to the fuel injector via another portion of the supply line that can include a common rail. Thus, fuel being delivered to the injectors generally flows in the passage portion 46 via the filter inlet port 37, through the filter 14, 15, or 114, and out the passage portion 46 via the filter outlet port 40. Recirculated fuel being returned from the fuel injectors will flow through the passage portion 46 via the injector return port 38 and the tank return port 39 without again passing through the filter 14, 15, or 114. Therefore, the supply passage to the injectors and the return passage from the injectors extend through the passage portion 46. Moreover, during priming, the priming pump can deliver fuel to the filter 14, 15, or 114 directly from the source of fuel via the priming port 36 of the passage portion 46. After passing through the filter 14, 15, or 114, the fuel can exit the passage portion 46 via the filter outlet port 40.

The illustrated passage portion 46 also defines a first bypass passage (not shown) and a second bypass passage (not shown). The first bypass passage fluidly connects the supply passage to the return passage within the passage portion 46. Once in the fuel return passage, the fuel will flow either through the pressure regulating valve 35 or around the same via the second fuel bypass passage. The first bypass passageway can be thought of as circumventing the fuel injectors, while the second bypass passageway can be thought of as fluidly connecting an upstream portion to a downstream portion of the return passage to circumvent pressure regulating valve 35. Both the first bypass passageway and the second bypass passageway are positioned and designed so that gases, including air and/or vapor, are easily passed there-through, but fuel is not. Thus, together, bypass passageways allow gas, which may originate in the area of the filter due to a filter change, to circumvent both the fuel injectors and the regulating valve during engine priming and start up. Although the present invention is being described for the passage portion 46, it should be appreciated that the present invention contemplates a filter base with only one passageway extending to and from the filter, and housing no sensors.

INDUSTRIAL APPLICABILITY

Referring to FIGS. 1-4, the present invention will be described for the filter bases 23 and 123 to which the fuel filters 14, 15, and 114 can be attached. However, it should be appreciated that the present invention contemplates various types of filters, including but not limited to oil filters, being attached to the filter base. In addition, although the filter bases 23, 123 are illustrated as attached to the engine housing 11, it should be appreciated that the filter base of the present invention need not be attached to an engine or included within a fluid system used in conjunction with an engine. For instance, the present invention may be suitable for use within certain water filtration systems.

Preferably, the filter bases 23, 123 can be attached to the engine housing 11 in a conventional manner. Before coupling a fuel filter to the filter bases 23, 123, the customer and/or manufacturer can choose which fuel filter will best meet their needs. The customer and/or manufacturer can choose between at least two fuel filters with different sized diameters and/or different types of seals. In the first embodiment of the present invention illustrated in FIG. 2, the customer can choose between the first fuel filter 14 with the relatively small diameter or the second fuel filter 15 with the relatively large diameter. For instance, in order to extend a time period between fuel filter changes and maintenance, the customer and/or manufacturer may choose the fuel filter 15 with the relatively large diameter. The second fuel filter 15 includes a larger filtration surface than the first fuel filter 14, and thus, may have a longer filter medium life than the first fuel filter 14.

If the customer or manufacturer were to choose the second fuel filter 15 with the relatively large diameter, the second adapter 21 will be attached, in a conventional manner, to the filter base 23. The second adapter 21 is appropriately sized to couple the second fuel filter 15 including the relatively large diameter to the filter base 23. Thus, an inner surface of the second fuel filter 15 can be mated to the threaded stud of the second adapter 21. In order to seal the contact area between the fuel filter 15 and the base 23 to prevent fuel from leaking from the fuel filter assembly during operation, the face seal 19 will make contact with the face seal receiving portion 28 of the second annular sealing surface 32 in a conventional manner. As the fuel filter 15 is being secured around the threads of the adapter 21, the face seal 19 that is positioned adjacent to the relatively large diameter of the second fuel filter 15 will be positioned between the second fuel filter 15 and the planar bottom surface 44 of the outer step 30 acting as the face seal receiving portion 28. The face seal 19 is designed to prevent leakage along the annular contact area between the fuel filter 15 and the filter base 23.

If the customer and/or manufacturer preferred, the first fuel filter 14 with the relatively small diameter and the first adapter 20 can be attached to the filter base 23 in a conventional manner. The first adapter 20 is sized to couple the first filter 14 with the relatively small diameter to the filter base 23. The first fuel filter 14 can be mated to the threaded stud of the first adapter 20 in a conventional manner. As the first fuel filter 14 is being mated to the first adapter 20, the radial seal 18 positioned adjacent to the relatively small diameter of the first filter 14 will make contact with the radial seal receiving portion 27. Because the radial seal 18 includes the D-shaped cross section whereas the face seal 19 includes the rectangular cross section, the radial seal receiving portion 27 of the first annular sealing surface 22 may have a different shape than the planar face seal receiving portion 28 of the second annular surface 32. The radial seal receiving portion 27 includes the annular rounded groove defined by the middle step 29 of the stepped surface 24. The radial seal 18 will be positioned between the radial seal receiving portion 27 of the first annular sealing surface 22 and the first fuel filter 14. Thus, as the fuel flows between the filter base 23 and the first filter 14, the radial seal 18 will protect against fuel leakage around the annular contact area between the first fuel filter 14 and the filter base 23. Further, if fuel does leak, the outer step 30 will act as a spray shield and deflect the fuel down the outer surface of the filter 14 and away from the engine.

According to the alternative embodiment of the present invention, the filter base 123 is capable of receiving both the first filter 114 and the second filter 15. Because the first filter 114 includes the face seal 119 positioned adjacent to the relatively small diameter, the face seal receiving portion 128 of the first annular sealing surface 122 will be a portion of the planar surface 144 rather than a stepped surface. Because the second fuel filter 15 also includes the face seal 19, the filter base 123 does not need, nor includes, a stepped surface. When the manufacturer and/or customer chooses the first filter 114 with the relatively small diameter, the first adapter 20 will be attached, in a conventional manner, to the filter base 123. Because the first filter 14 and the first filter 114 include the relatively small diameter, the same first adapter 20 can preferably be used to couple both filters 14 and 114 to the filter base 23 and 123, respectively. As the first filter 114 is being mated to the threaded portion of the first adapter 20, the rectangular face seal 119 positioned adjacent the relatively small diameter of the first filter 114 will make contact with the bottom, planar surface 144 of the filter base 123. The face seal 119 will be positioned between the first fuel filter 114 and the planar surface 144 of the filter base 123 in order to prevent leakage around the annular contact area during operation. If the manufacturer and/or customer prefers the second fuel filter 15 with the relatively large diameter, the second fuel filter 15 can be attached to the filter base 123 using the same methods as described for the other embodiment of the present invention.

Although the present invention is described for the filter bases 23 and 123 capable of receiving either filters 14 and 15 or filters 114 and 15, it should be appreciated that the present invention contemplates a filter base that can receive a filter with a relatively small diameter and a filter with a relatively large diameter, both including radial seals, and a small diameter face seal filter and a relatively large diameter radial seal filter. Moreover, although the present invention is discussed for filter bases being capable of receiving two filters, each with different sized diameters, it should be appreciated that the present invention contemplates a filter base being capable of receiving more than two filters, each having different sized diameters. It should be appreciated that the more steps included within the stepped portion 24, the more filters of various diameters including radial seals can be attached to the filter base. The planar portions between cylindrical portions could act as face seal for various sized filters. Similarly, the larger the planar surface 44, 144 of the sealing portion 26, 126, the more filters of various diameters including face seals can be attached to the filter base 23, 123. Although the invention has been illustrated showing large and small diameter filters, the invention also contemplates identically sized filters that seal at two different locations and possible different ways with respect to the filter base. This alternative may give a user a choice of sealing types for otherwise identical filters.

The present invention is advantageous because it provides one filter base 23 and 123 that can accept multiple fuel filters 14 and 15, or 14 and 115 by providing multiple sealing surfaces 27 and 28, or 28 and 128, respectively. The fuel filters 14, 15, 114 include different sized diameters and/or types of seals. Thus, the customer and/or manufacturer has a choice as to the size of filter and type of seal to use within the engine. Further, the customer and/or manufacturer can reduce the time interval between fuel filter changes by attaching the filter with the larger diameter to the fuel base 23, 123. In addition, the larger fuel filter can help assure that fuel is properly filtrated with the fuel quality is poorer than expected. Moreover, the fact that each fuel filter 14, 15, 114 with a different diameter and/or seal does not require a different fuel base is advantageous because it can reduce the number of parts to manage. For instance, less assembly lines producing filter bases would be needed. In addition, it would reduce the number of filter bases that must be carried, thereby reducing the difficulties associated with tracking various types of filter bases.

It should appreciated that the filter base of the present invention can be applicable to filtration of fluids other than fuel, including but not limited to oil. It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A filter kit comprising:
a filter base having
a first annular surface,
a second annular surface positioned radially inwardly of the first annular surface and spaced axially inwardly from the first annular surface toward an interior of said filter base,
a first cylindrical inner surface adjoining the first and second annular surfaces,
a third annular surface positioned radially inwardly of the second annular surface and spaced axially inwardly from the second annular surface toward the interior of said filter base,
a second cylindrical inner surface adjoining the second and third annular surfaces,
a fourth annular surface positioned radially inwardly of the third annular surface and spaced axially inwardly from the third annular surface toward the interior of the filter base,
a third cylindrical inner surface adjoining the third and fourth annular surfaces,
an internally threaded outlet port coaxially positioned on the fourth annular surface, and
an inlet port in the fourth annular surface radially spaced between the third cylindrical inner surface and the internally threaded outlet port;
a first filter having a face seal receivable by the first annular surface;
a second filter having a radial seal receivable by the second radial surface;
a first adapter having a first externally threaded and engageable with the internally threaded outlet port of the filter base and a second externally threaded end threadedly engageable with an internally threaded outlet port of the first filter;
a second adapter having a first externally threaded end engageable with the internally threaded outlet port of the filter base and a second externally threaded end threadedly engageable with an internally threaded outlet port of the second filter.

2. The filter base of claim 1, wherein the first cylindrical inner surface forms a spray shield when used with the second filter.

3. The filter base of claim 1, further comprising a temperature sensor attachment portion.

4. The filter base of claim 1, further comprising a pressure sensor attachment portion.

* * * * *